United States Patent
Iacovangelo

(10) Patent No.: US 6,517,687 B1
(45) Date of Patent: *Feb. 11, 2003

(54) ULTRAVIOLET FILTERS WITH ENHANCED WEATHERABILITY AND METHOD OF MAKING

(75) Inventor: Charles Dominic Iacovangelo, Schenectady, NY (US)

(73) Assignee: General Electric Company, Niskayuna, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,656

(22) Filed: Mar. 17, 1999

(51) Int. Cl.⁷ .................. C23C 14/35; C23C 14/30; C23C 14/10; H05H 1/48; H05H 1/50
(52) U.S. Cl. ............... 204/192.26; 427/580; 427/529; 427/525; 204/192.38; 204/199.22
(58) Field of Search ................ 427/453, 455, 427/529, 530, 531, 564, 566, 567, 576, 580, 525, 527, 579; 204/192.38, 192.16, 192.22, 192.26, 192.29

(56) References Cited

U.S. PATENT DOCUMENTS

| | | |
|---|---|---|
| 3,161,615 A | 12/1964 | Goldberg |
| 3,220,973 A | 11/1965 | Goldberg |
| 3,312,659 A | 4/1967 | Kurkjy et al. |
| 3,312,660 A | 4/1967 | Kurkjy et al. |
| 3,313,777 A | 4/1967 | Elam et al. |
| 3,576,656 A | 4/1971 | Webb et al. |
| 3,666,614 A | 5/1972 | Snedeker et al. |
| 3,984,581 A * | 10/1976 | Dobler et al. ............... 427/525 |
| 3,989,672 A | 11/1976 | Vestergaard |
| 4,194,038 A | 3/1980 | Baker et al. |
| 4,200,681 A | 4/1980 | Hall et al. |
| 4,210,699 A | 7/1980 | Schroeter et al. |
| 4,224,378 A | 9/1980 | Schroeter et al. |
| 4,242,381 A | 12/1980 | Goossens et al. |
| 4,454,275 A | 6/1984 | Rosenquist |
| 4,560,577 A * | 12/1985 | Mirtich et al. ............. 427/525 |

(List continued on next page.)

FOREIGN PATENT DOCUMENTS

| | | | |
|---|---|---|---|
| EP | 0768277 A1 | * | 4/1997 |
| EP | 0887437 A2 | * | 12/1998 |
| JP | 403052675 A | * | 3/1991 |
| JP | 08249929 A | * | 9/1996 |
| WO | 8901957 | | 8/1988 |
| WO | 9213517 | | 2/1992 |
| WO | 9713802 | | 10/1996 |

OTHER PUBLICATIONS

Translation of JP08249929 to Shigekazu Tomai et al (Sep. 27, 1996) (Indemitsu Kosan Co Ltd.).*

S. Anders et al., Formation of Metal Oxides by Cathodic Arc Deposition, 76–77 Surface and Coatings Technology 167–73 (1995). No Month.

(List continued on next page.)

*Primary Examiner*—Marianne Padgett
(74) *Attorney, Agent, or Firm*—Andrew J. Caruso; Noreen C. Johnson

(57) ABSTRACT

An ultraviolet radiation absorbing layer formed over a polymeric substrate is disclosed herein. The layer is a doped metal oxide coating. The layer exhibits excellent weatherability and UV absorbing properties. The layer is preferably deposited by arc plasma deposition or by sputtering.

13 Claims, 10 Drawing Sheets

U.S. PATENT DOCUMENTS

| | | | | |
|---|---|---|---|---|
| 4,799,745 | A | * | 1/1989 | Meyer et al. .......... 204/192.27 |
| 4,815,962 | A | * | 3/1989 | Cardone ................... 427/525 |
| 4,842,941 | A | | 6/1989 | Devins et al. |
| 4,871,580 | A | | 10/1989 | Schram et al. |
| 4,927,704 | A | | 5/1990 | Reed et al. |
| 4,948,485 | A | | 8/1990 | Wallsten et al. |
| 4,959,257 | A | * | 9/1990 | Mukherjee ................. 428/156 |
| 5,008,148 | A | | 4/1991 | Thurm et al. |
| 5,013,416 | A | * | 5/1991 | Murayama et al. ......... 427/525 |
| 5,051,308 | A | | 9/1991 | Reed et al. |
| 5,094,693 | A | * | 3/1992 | Cordaro et al. ............. 106/425 |
| 5,156,882 | A | | 10/1992 | Rzad et al. |
| 5,298,587 | A | | 3/1994 | Hu et al. |
| 5,306,408 | A | * | 4/1994 | Freglio ....................... 427/580 |
| 5,320,875 | A | | 6/1994 | Hu et al. |
| 5,433,786 | A | | 7/1995 | Hu et al. |
| 5,463,013 | A | | 10/1995 | Tokuda et al. |
| 5,480,722 | A | | 1/1996 | Tomonaga et al. |
| 5,494,712 | A | | 2/1996 | Hu et al. |
| 5,510,448 | A | | 4/1996 | Fontane et al. |
| 5,614,248 | A | | 3/1997 | Schiller et al. |
| 5,635,087 | A | | 6/1997 | Schiller et al. |
| 5,718,967 | A | | 2/1998 | Hu et al. |
| 5,916,668 | A | * | 6/1999 | Long et al. ................. 428/215 |
| 6,136,161 | A | * | 10/2000 | Yu et al. ................ 204/192.29 |
| 6,207,292 | B1 | * | 3/2001 | Berneth et al. ............. 428/583 |

OTHER PUBLICATIONS

H. Bolt et al., "Gradient Metal–13 a–C:H Coatings Deposited From Dense Plasma by a Combined PVD/CVD Process", 98 *Surface and Coatings Technol.ogy* p. 1518–1523 (1998). No Month.

D.E. Brodie et al., "Characterization of ZnO for the Fabrication of Conductor–Insulator–Semiconductor (CIS) Solar Cells", Conf. Proc. for IEEE 14th Photovoltaic Spec. Conf. 468–471 (Jan. 7–10, 1980).

D.A. Gerdeman and N.L. Hecht, *Arc Plasma Technology in Materials Science* 1–17 (1972). No Month.

S. Jager et al., "*Comparison of Transparent Conductive Oxide Thin Films Prepared by A.C. and D.C. Reactive Magnetron Sputtering,*" 98 Surface and Coatings Technology, p. 1304–1314 (1998). No Month.

Jianhua Hu and Roy G. Gordon, "*Deposition of Boron Doped Zinc Oxide Films and Their Electrical and Optical Properties*", vol. 139, No. 7, J. Electrochem. Soc. p. 2014–2022 (Jul. 1992).

Z.–C. Jin et al., "*Optical Properties of Sputter–Deposited ZnO:Al Thin Films*",64(10), J. Appl. Phys., p. 5117–5131 (Nov. 15, 1988).

R.A. MacGill et al., "*Cathodic Arc Deposition of Copper Oxide Thin Films*", 78 Surface and Coatings Technology 168–72 (1996). No Month.

S. Major et al., "*Electrical and Optical Transport in Undoped and Indium–doped Zinc Oxide Films*",1(2), J. Mater. Res., pp. 300–310 (Mar./Apr. 1986).

S. Major et al., "*Highly Transparent and Conducting Indium–Doped Zinc Oxide Films by Spray Pyrolysis*", 108 Thin Solid Films, pp. 333–340 (1983). No Month.

S. Maniv et al., "*Transparent Conducting Zinc Oxide and Indium–Tin Oxide Films Prepared by Modified Reactive Planar Magnetron Sputtering*",A1(3), J. Vac. Sci. Tech., pp. 1370–1375 (Jul./Sep. 1983).

Tadatsugu Minami et al., "*Group III Impurity Doped Zinc Oxide Thin Films Prepared by RF Magnetron Sputtering*", vol. 24, No. 10, Japanese J. of Appl. Phy., pp. L781–L784, (Oct. 1985).

Tadatsugu Minami et al., "*Highly Conductive and Transparent Silicon Doped Zinc Oxide Thin Films Prepared by RF Magnetron Sputtering*", vol. 25, No. 9, Japanese J. of Appl. Phys., pp. L776–L779, (Sep. 1986).

M. Miyazaki and E. Ando, "*Durability Improvement of Ag–Based Low–Emissivity Coatings,*" 178, J. Non–Crystalline Solids, pp. 245–249 (1994). No Month.

C.X. Qiu and I. Shih, "*Tin– and Indium–Doped Zinc Oxide Films Prepared by RF Magnetron Sputtering*", 13 Solar Energy Materials, pp. 75–84 (1986). No Month.

D. Raviendra and J.K. Sharma, "Electrodes Deposition of Cadmium Stannate, Zinc Oxide, and Aluminum–Doped Zinc Oxide Films", 58(2), *J. Appl. Phys.*, pp. 838–844 (Jul. 1985).

R.E.I. Schropp et al., "Transparent and Conductive Thin Films of ZnO for Photovoltaic Applications Prepared by RF Magnetron Sputtering", 1, Conf. Rec. of 20th IEEE Photovoltaic Spec. Conf. 273–276 (Sep. 26, 1988).

B.E. Sernelius et al., Band–Gap Tailoring of ZnO by Means of Heavy Al Doping, vol. 37, No. 17, Physical Review B of Am. Phys. Soc., pp. 10244–10248 (Jun. 15, 1988).

I. Shih and C.X. Qiu, "Indium–Doped Zinc Oxide Thin Films Prepared by RF Magnetron Sputtering", 58(6), J. Appl. Phys., pp. 2400–2401 (Sep. 15, 1985).

S. Sreedhara Reddy et al., Optical Properties of Spray Deposited ZnO Films, vol. 77, No. 12, Solid State Communications, 899–901 (1991). No Month.

* cited by examiner

ULTRAVIOLET FILTERS WITH ENHANCED WEATHERABILITY AND METHOD OF MAKING

FIELD OF THE INVENTION

The present invention relates generally to a coating for transparent substrates with high UV absorbency and excellent weatherability, and more particularly to a doped metal oxide coating for transparent polymeric substrates.

BACKGROUND

Car manufacturers have traditionally used glass as the material for car windows. However, recently it has become desirable to substitute glass windows with polymeric windows, such as polycarbonate (PC) windows. Polymeric windows are often advantageous compared to glass windows because of their low weight, high strength and ease of shaping. However, some polymeric windows, such as PC windows, turn yellow after being exposed to the ultraviolet (UV) radiation in sunlight. The yellow windows suffer from poor transmission of visible light, thus making them unsuitable for many car window applications.

One solution to the UV damage problem is to coat the polymeric substrates with a $TiO_2$ (titanium dioxide) layer. The $TiO_2$ coating acts as a partial absorber of UV radiation and provides a measure of protection for some applications. However, $TiO_2$ generally provides an insufficient amount of UV absorption, and windows coated with $TiO_2$ eventually turn a shade of yellow. $TiO_2$ is also a photocatalyst for oxidation of polymers. Therefore, $TiO_2$ coated polymers are generally unsuitable as a car window material.

Another solution to the UV damage problem is to coat the polymers with a ZnO (zinc oxide) layer. Zinc oxide provides UV absorption to higher wavelengths than $TiO_2$, providing greater protection for polycarbonate and other polymeric substrates. Therefore, polymers coated with ZnO generally do not turn yellow when exposed to sunlight. However, prior art ZnO coatings are known to dissolve in water. Poor water soak stability on many substrates, including polycarbonate (PC), has thus surfaced as one potential limitation to the use of ZnO as a UV absorber for car windows, because car windows are frequently exposed to rain and snow.

In view of the foregoing, it would be beneficial to have a coating for a transparent substrate that exhibits good UV absorption and chemical stability. It would also be desirable to have a method for effectively applying such a coating.

SUMMARY

According to an exemplary embodiment, the invention provides a structure which includes a polymeric substrate and a weather-resistant and UV absorbent doped zinc oxide layer on the polymeric substrate. The doped zinc oxide layer may comprise, among other examples, indium doped zinc oxide (IZO) or aluminum doped zinc oxide (AZO).

According to another aspect, the present invention comprises a window for use in a vehicle, a building, a display device, or an apparatus comprising a polymeric base and a weather-resistant UV absorption layer comprising a doped zinc oxide layer on the polymeric base.

According to another embodiment, the invention comprises a method of protecting polymeric substrates from UV degradation comprising coating the polymeric substrate with a layer comprising a doped zinc oxide layer.

The invention also relates to a method of forming an indium doped zinc oxide layer on a substrate comprising the steps of placing the substrate in a sputtering chamber, providing indium and zinc in at least one target, and performing DC magnetron sputtering on the target to form an indium doped zinc oxide layer on the substrate.

DETAILED DESCRIPTION OF THE PREFERRED EMBODIMENTS

Figure 2:
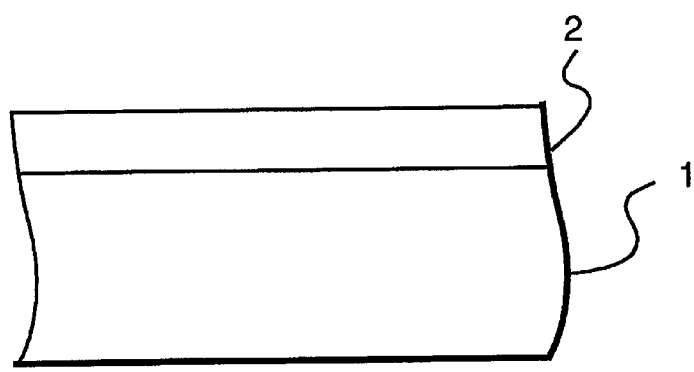
FIG. 2 is side cross sectional view of a glazed substrate according to an embodiment of the present invention.

A coated structure according to an exemplary embodiment of the invention is shown in FIG. 2. The coated structure includes a substrate 1 and a UV absorption layer 2. The thickness of the substrate 1 and UV absorption layer 2 is not necessarily to scale. Typically, the substrate 1 comprises a clear polymeric material such as polycarbonate. The UV absorption layer 2 typically comprises a doped metal oxide such as indium doped zinc oxide (IZO) or aluminum doped zinc oxide (AZO).

Figure 1:
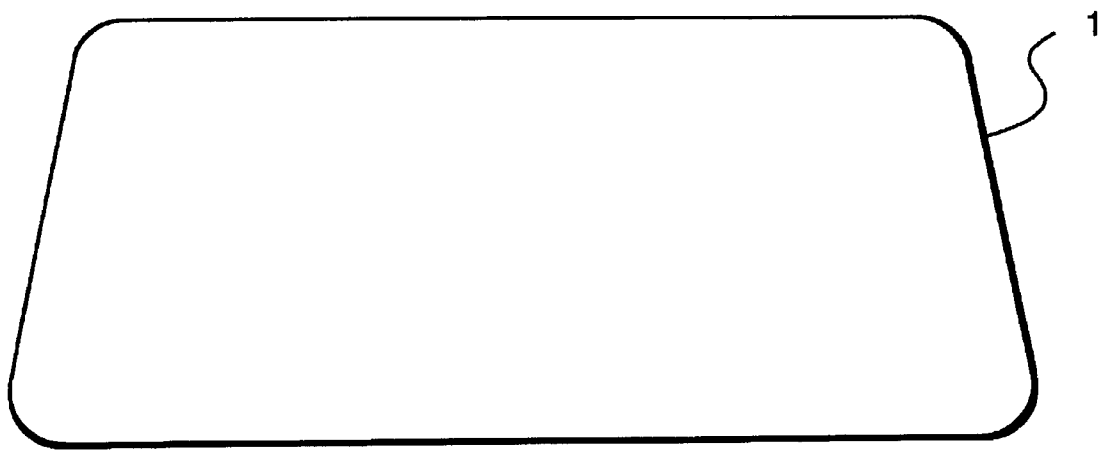
FIG. 1 shows an example of a substrate, according to one embodiment of the invention.

The coated substrate is preferably a vehicle window, such as a car, truck, motorcycle, tractor, boat or airplane window, as shown in FIG. 1. The coated substrate may be used in other applications, such as building windows, architectural materials, or manufacturing apparatus portholes, e.g. viewing areas that allow the user to look inside metal or industrial manufacturing apparatus. The substrate may also comprise a display screen, such as a television screen, an LCD screen, a computer monitor screen, a plasma display screen or a glare guard for a computer monitor. Display screens benefit from being coated with the UV absorption layer to prevent the screen from turning yellow and to prevent UV radiation from damaging electronic components inside the display.

The substrate 1, according to exemplary embodiments of the invention, typically comprises a polymer resin. For example, the substrate may comprise a polycarbonate. Polycarbonates suitable for forming the substrate are well-known in the art and generally comprise repeating units of the formula:

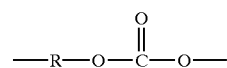

where R is a divalent aromatic radical of a dihydric phenol (e.g., a radical of 2,2-bis(4-hydroxyphenyl)-propane, also known as bisphenol A) employed in the polymer producing reaction; or an organic polycarboxylic acid (e.g. terphthalic acid, isophthalic acid, hexahydrophthalic acid, adipic acid, sebacic acid, dodecanedioic acid, and the like). These polycarbonate resins are aromatic carbonate polymers which may be prepared by reacting one or more dihydric phenols with a carbonate precursor such as phosgene, a haloformate or a carbonate ester. One example of a polycarbonate which can be used is LEXAN®, manufactured by the General Electric Company.

Aromatic carbonate polymers may be prepared by methods well known in the art as described, for example, in U.S. Pat. Nos. 3,161,615; 3,220,973; 3,312,659; 3,312,660; 3,313,777; 3,666,614; 3,989,672; 4,200,681; 4,842,941; and 4,210,699, all of which are incorporated herein by reference.

The substrate may also comprise a polyestercarbonate which can be prepared by reacting a carbonate precursor, a dihydric phenol, and a dicarboxylic acid or ester forming derivative thereof. Polyestercarbonates are described, for example, in U.S. Pat. Nos. 4,454,275; 5,510,448; 4,194,038; and 5,463,013.

The substrate may also comprise a thermoplastic or thermoset material. Examples of suitable thermoplastic materials include polyethylene, polypropylene, polystyrene, polyvinylacetate, polyvinylalcohol, polyvinylacetal, polymethacrylate ester, polyacrylic acids, polyether, polyester, polycarbonate, cellulous resin, polyacrylonitrile, polyamide, polyimide, polyvinylchloride, fluorine containing resins and polysulfone. Examples of suitable thermoset materials include epoxy and urea melamine.

Acrylic polymers, also well known in the art, are another material from which the substrate may be formed. Acrylic polymers can be prepared from monomers such as methyl acrylate, acrylic acid, methacrylic acid, methyl methacrylate, butyl methacrylate, cyclohexyl methacrylate, and the like. Substituted acrylates and methacrylates, such as hydroxyethyl acrylate, hydroxybutyl acrylate, 2-ethylhexylacrylate, and n-butylacrylate may also be used.

Polyesters can also be used to form the substrate. Polyesters are well-known in the art, and may be prepared by the polyesterification of organic polycarboxylic acids (e.g., phthalic acid, hexahydrophthalic acid, adipic acid, maleic acid, terphthalic acid, isophthalic acid, sebacic acid, dodecanedioic acid, and the like) or their anhydrides with organic polyols containing primary or secondary hydroxyl groups (e.g., ethylene glycol, butylene glycol, neopentyl glycol, and cyclohexanedimethanol).

Polyurethanes are another class of materials which can be used to form the substrate. Polyurethanes are well-known in the art, and are prepared by the reaction of a polyisocyanate and a polyol. Examples of useful polyisocyanates include hexamethylene diisocyanate, toluene diisocyanate, MDI, isophorone diisocyanate, and biurets and triisocyanurates of these diisocyanates. Examples of useful polyols include low molecular weight aliphatic polyols, polyester polyols, polyether polyols, fatty alcohols, and the like.

Examples of other materials from which the substrate may be formed include acrylonitrile-butadiene-styrene, glass, VALOX® (polybutylenephthalate, available from General Electric Co.), XENOY® (a blend of LEXAN® and VALOX®, available from General Electric Co.), polyestercarbonate (PPC), polyethersulfone (PES) (sold under the trademark "Radel®" by Amoco), polyetherimide (PEI or polyimide) (sold under the trademark "Ultem®" by the General Electric Company), and the like.

The substrate can be formed in a conventional manner, for example by injection molding, extrusion, cold forming, vacuum forming, blow molding, compression molding, transfer molding, thermal forming, and the like. The article may be in any shape and need not be a finished article of commerce, that is, it may be sheet material or film which would be cut or sized or mechanically shaped into a finished article. The substrate may be rigid or flexible. The substrate may be transparent or not transparent.

Referring again to FIG. 2, the UV absorption layer 2 typically comprises a doped metal oxide having a thickness of 1–1000 nm, typically 300–600 nm. The present inventor has discovered that the limitations associated with the multilayer films or structures of the prior art can be overcome with a polymeric structure coated with a doped metal oxide such as indium doped zinc oxide (IZO). The IZO layer displays superior UV absorption and weather resistance as compared to other UV absorption materials. The IZO layer shows excellent weather resistance since it does not become hazy or lose its ability to absorb UV light after being submerged for an extended period in 650° C. water. In addition, after being subjected to a QUV® accelerated weathering test involving exposure to UV radiation, IZO layers had an optical density of at least 4 at 350 nm showing substantially no increase in haze, and only a negligible decrease in UV absorption. Optical density ("OD", also referred to as "absorbance") is defined as $\log(l_i/l_o)$, where $l_i$ is the intensity of incident light on the doped zinc oxide layer and $l_o$ is the output intensity. Unless otherwise specified the wavelength of light at which optical density is measured is 350 nm (UV).

Because the IZO film exhibits excellent absorbance in the UV region (wavelengths of 1 to 380 nm), it protects polymeric substrates from turning yellow, unlike coatings that contain prior art UV absorbers. Preferably, the IZO layers of the present invention have optical density values greater than 1.0, typically greater than 2.0, more typically greater than 3.0, more typically greater than 4.0, at 350 nm.

The present inventor has found that the IZO layer maintains chemical stability and desirable optical properties even with a relatively high indium content. For example, indium may comprise 2–15 atomic percent or more of the total metal content of the IZO layer 2, such that the material has the following atomic composition: $In_{0.02-0.15}Zn_{0.85-0.98}O$, while maintaining good chemical stability and UV absorption. If desired, the indium may comprise as much as 30 atomic percent or more of the total metal content of the IZO layer while maintaining desirable UV absorption. According to various embodiments of the invention, the indium content may comprise greater than 3.0, 5.0, or 10.0 atomic percent of the total metal content of the IZO layer.

The inventor has also discovered that certain deposition methods, e.g. DC magnetron sputtering, produce IZO layers having a relatively high initial optical density, e.g. 3.0, a low loss of optical density under a water soak test, e.g. 0.02 per day, and a relatively low increase in haze under the water soak test, e.g. 0.3% per day. These properties, which indicate good chemical stability, can be achieved by DC magnetron sputtering with a modest amount of indium, e.g. 2–5 atomic percent of the total metal content.

IZO also provides the advantage that the IZO layer is electrically conductive. Therefore the IZO layer of the present invention may be used as a window defogger on an automobile window, since it is typically transparent. Another application of IZO layer(s) of the present invention may be in theft or break-in deterrence. A window coated with the IZO layers may carry a low current passed through the IZO layers. When a window is broken by a thief or chemically attacked, the current flow through the IZO layers is interrupted which sets off an alarm.

Figure 3A:
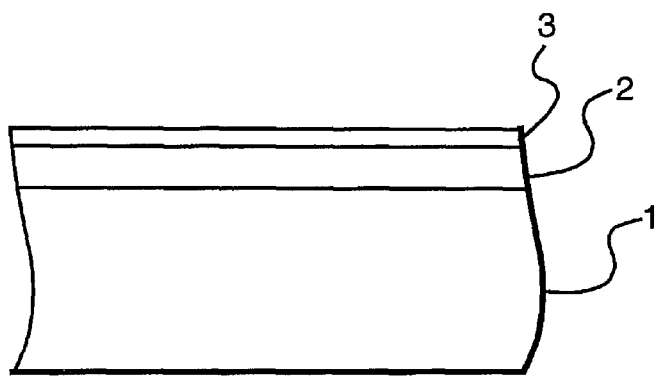
FIGS. 3A–E are side cross sectional views of a glazed substrate according to alternative embodiments of the present invention.

An alternative embodiment of the present invention is shown in FIG. 3A. In this embodiment, an optional scratch or abrasion resistant coating 3 is formed on the metal oxide UV absorption layer 2. The abrasion resistant layer 3 minimizes or even prevents the UV absorption layer 2 from being scratched during use. The abrasion resistant layer 3 may comprise, for example, a plasma polymerized organosilicon material. The organosilicon material may comprise, for example, octamethylcyclotetrasiloxane (D4) tetramethyldisiloxane (TMDSO), hexamethyldisiloxane (HMDSO), or other organosilicon, as described in the above copending application. The organosilicon monomers are oxidized, decomposed, and polymerized in an arc plasma deposition apparatus, typically with a stoichiometric excess of oxygen, to form an abrasion resistant layer which comprises an oxidized D4, TMDSO, or HMDSO layer, for example. Such an abrasion resistant layer may be referred to as an $SiO_x$ layer. However, the $SiO_x$ layer may also contain hydrogen and carbon atoms in which case it is generally referred to as $SiO_xC_yH_z$.

Other examples of materials suitable for the abrasion-resistant material include silicon dioxide and aluminum oxide, for example, or mixtures thereof.

Figure 3B:
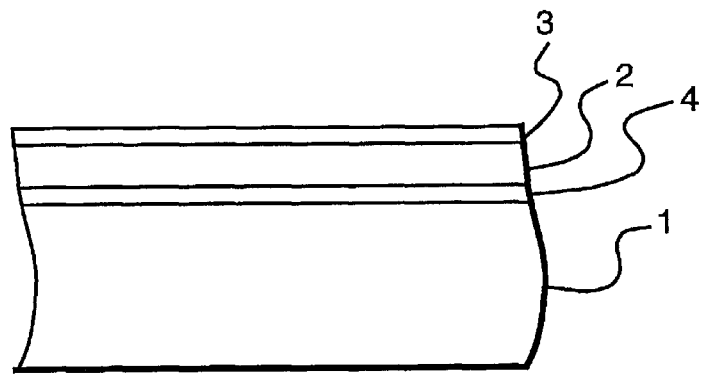

Another embodiment of the present invention is shown in FIG. 3B. In this embodiment, an interlayer layer 4 is formed between the substrate 1 and the UV absorbing layer 2. Optionally, another alternative is to add an abrasion resistant layer 3 to this embodiment. The interlayer 4, which is typically organic, acts as a stress relief layer which relieves stress between the substrate 1 and the overlying layers. The stress may occur due to different coefficients of thermal expansion, different ductility and different elastic modulus of the substrate and the overlying layers. Preferably, the interlayer 4 comprises a material which has a value of coefficient of thermal expansion, ductility and elastic modulus that is between the corresponding values of the substrate 1 and the overlying layers. Such materials may include, for example, a polymerized organosilicon or polymerized hydrocarbon and a silicone hardcoat.

A typical silicone hardcoat is a composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical. Typically, at least 70 weight percent of the silanol comprises $CH_3Si(OH)_3$, and the composition contains 10 to 50 weight percent solids. The solids consist essentially of 10 to 70 weight percent colloidal silica and 30 to 90 weight percent of the partial condensate. Examples of silicone hardcoats are described in U.S. Pat. No. 4,842,941, which is hereby incorporated by reference.

Figure 3C:
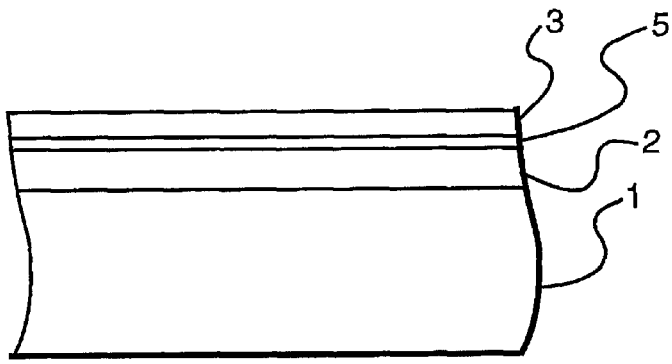
Figure 3D:
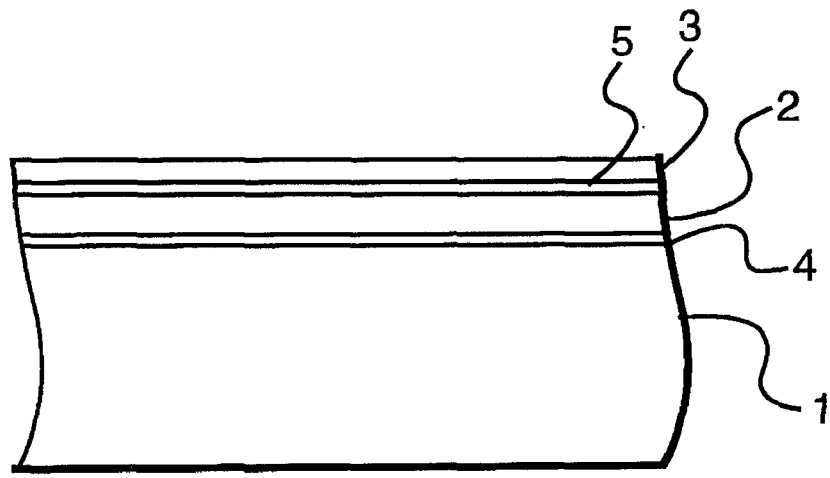

In another embodiment of the present invention, an interlayer 5 may be formed between the metal oxide UV absorption layer 2 and the abrasion resistant layer 3, as shown in FIG. 3C. Layer 5 relives stress between layers 2 and 3 that occurs due to different coefficients of thermal expansion, different ductility and different elastic modulus of layers 2 and 3. Layer 5 may comprise aluminum or a polymerized organosilicon, for example. Interlayer 5 may be used together with interlayer 4, as shown in FIG. 3D. However, the interlayer 5 is optional, and may be omitted as in FIG. 3B, if layer 2 comprises IZO since this layer acts as a compliant layer for an outer abrasion resistant layer due to its intermediate coefficient of thermal expansion, high ductility and modulus.

Figure 3E:
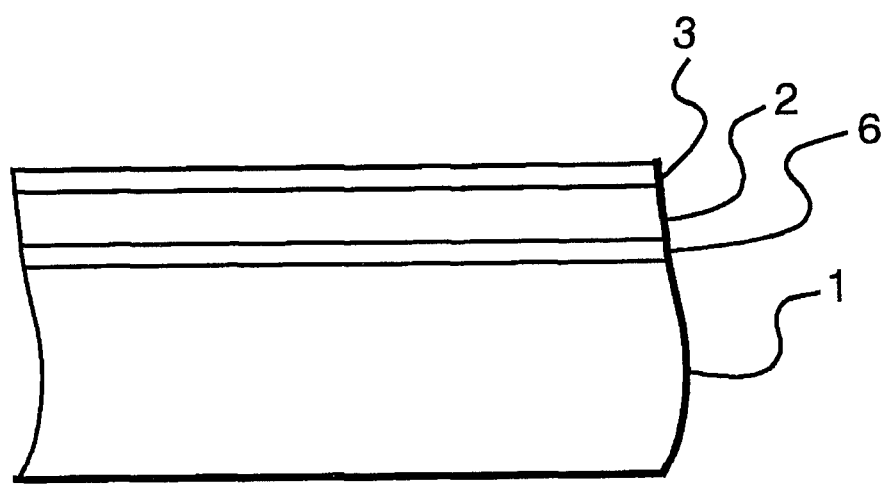

Although the IZO layer deposited directly on polymeric substrates has sufficient adhesion strength to the substrate without an adhesion promoting layer, an adhesion promoting layer 6 may be formed between the substrate 1 and the UV absorption layer 2, as shown in FIG. 3E. The adhesion promoting layer 6 may be any suitable adhesion promoting material, and preferably comprises a 10 to 40 nm thick aluminum or silver layer, as described in commonly-owned U.S. application Ser. No. 09/271,657 which is hereby incorporated by reference in its entirety.

According to further embodiments of the invention, one or more of the layers depicted in FIGS. 3A–3E may be applied to both sides of the substrate 1. For example, both the outside and inside surfaces of the substrate may include an interlayer 4, a UV absorption layer 2, and an abrasion resistant layer 3. Alternatively, the outside surface of the substrate may include one or more of layers 2, 3, 4, 5, 6, while the inside surface of the substrate 1 includes one or more of layers 2, 3, 4, 5, 6.

There is also provided, in another aspect of the invention, a method of coating polymeric substrates to form the coated structures of the present invention comprising forming a doped zinc oxide layer over the polymeric substrate. The metal oxide UV absorption layer may be deposited by a variety of methods, such as chemical vapor deposition (CVD), evaporation (thermal, RF or electron beam), reactive evaporation, sputtering (DC, RF, microwave and/or magnetron), arc plasma deposition, and reactive sputtering. Typically, the layers are deposited by RF or DC magnetron sputtering.

Figure 4:
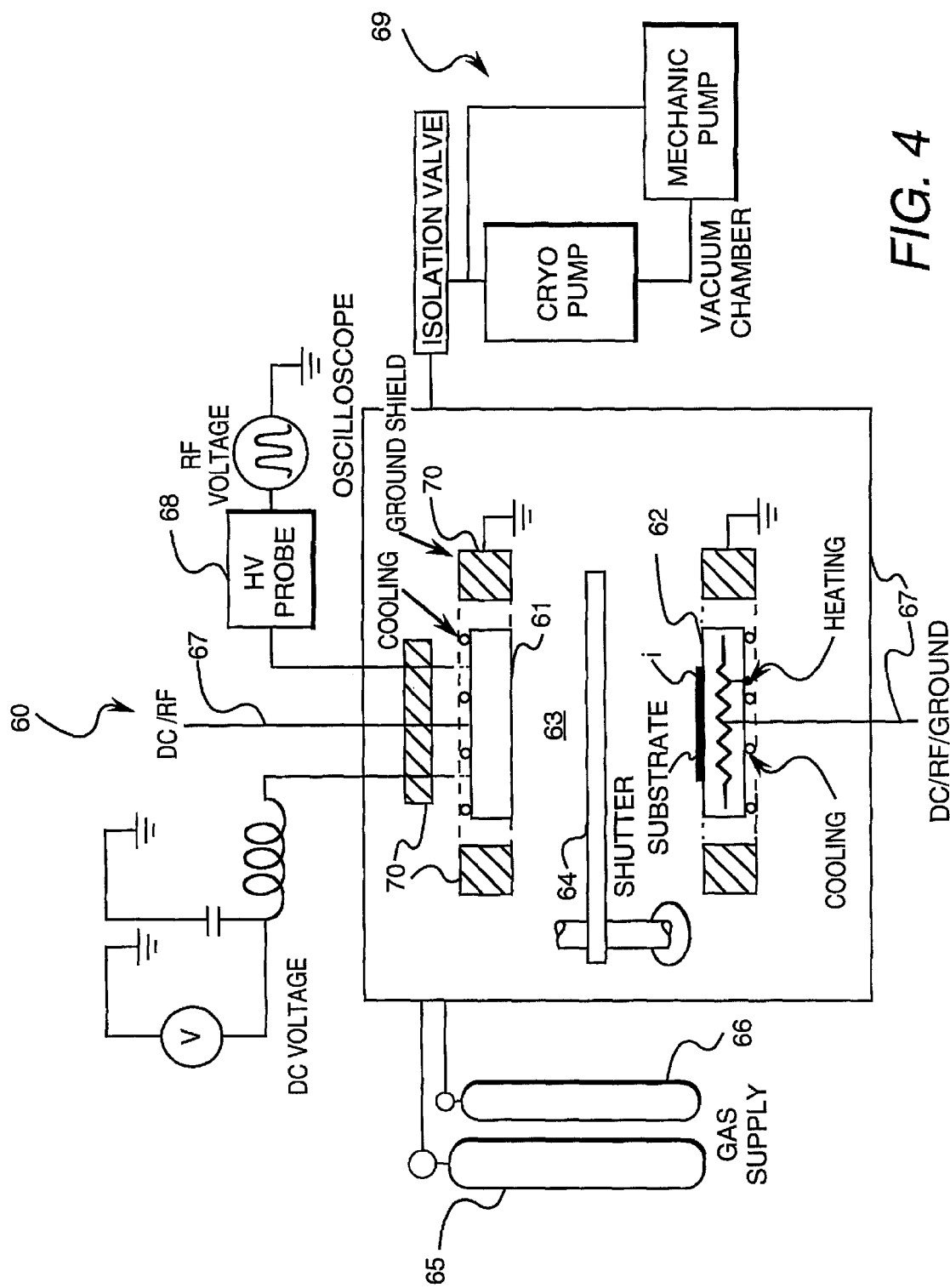
FIG. 4 is a side cross sectional view of an exemplary apparatus used to manufacture the glazed substrate.

FIG. 4 illustrates an apparatus which may be used to deposit the layers of the coated article by reactive sputtering, according to an exemplary embodiment of the invention. The reactive sputtering apparatus 60 preferably comprises a reactant target 61, a substrate holder or support 62, a plasma reaction space 63 between the support and the target, an optional shutter 64 that separates the target from the support, a plasma gas supply tank 65, a reactant gas supply tank 66 for reactive sputtering, and DC or RF voltage supply lines 67 and 67'. The apparatus may optionally comprise a testing probe/oscilloscope 68. The apparatus is preferably evacuated by at least one mechanical pump, turbo pump, and/or cryopump 69. The target 61 may be cooled by flowing water on its back side. The support 62 may be heated, cooled or biased as desired. In case more precise control of the plasma is desired, magnets 70 may be provided above or adjacent to the target 61 to form a DC or RF magnetron sputtering apparatus.

To form IZO layers, the target 61 preferably comprises solid IZO containing 0–15 weight %, and preferably 1.5 weight % indium, and the sputtering gas comprises Ar or a mixture of Ar with an oxidant such as oxygen or nitrous oxide ($N_2O$). By using a 1.5 weight % indium target, an IZO layer containing 2.5 atomic % indium may be formed. However, the target may comprise In:Zn of the same indium content as the IZO target and the sputtering gas may comprise a mixture of Ar and oxygen or $N_2O$ (i.e. the IZO layers may be formed by reactive sputtering). The chamber 63 is typically pumped down by pump(s) 69. A sputtering gas, such as Ar, is filled into space 63 from gas supply tank 65. A DC or RF voltage is applied to the target, which causes the sputtering gas to form a plasma. The plasma atoms and ions bombard the target due to the negative charge applied to the target. The plasma bombardment causes reactant atoms to be sputtered off from the target 61 and to drift toward the substrate 1 on the support 62. Alternatively, adjacent but separate Zn and In targets may be used to form the IZO layer.

Furthermore, by covering the target 61 with shutter 64 and applying a negative charge to the support 62, the Ar plasma may be used to bombard the substrate 1. This causes the plasma to sputter clean the substrate 1 or any layers thereon prior to depositing layer 2. This increases process throughput by eliminating a separate cleaning step in a separate chamber.

Figure 5:
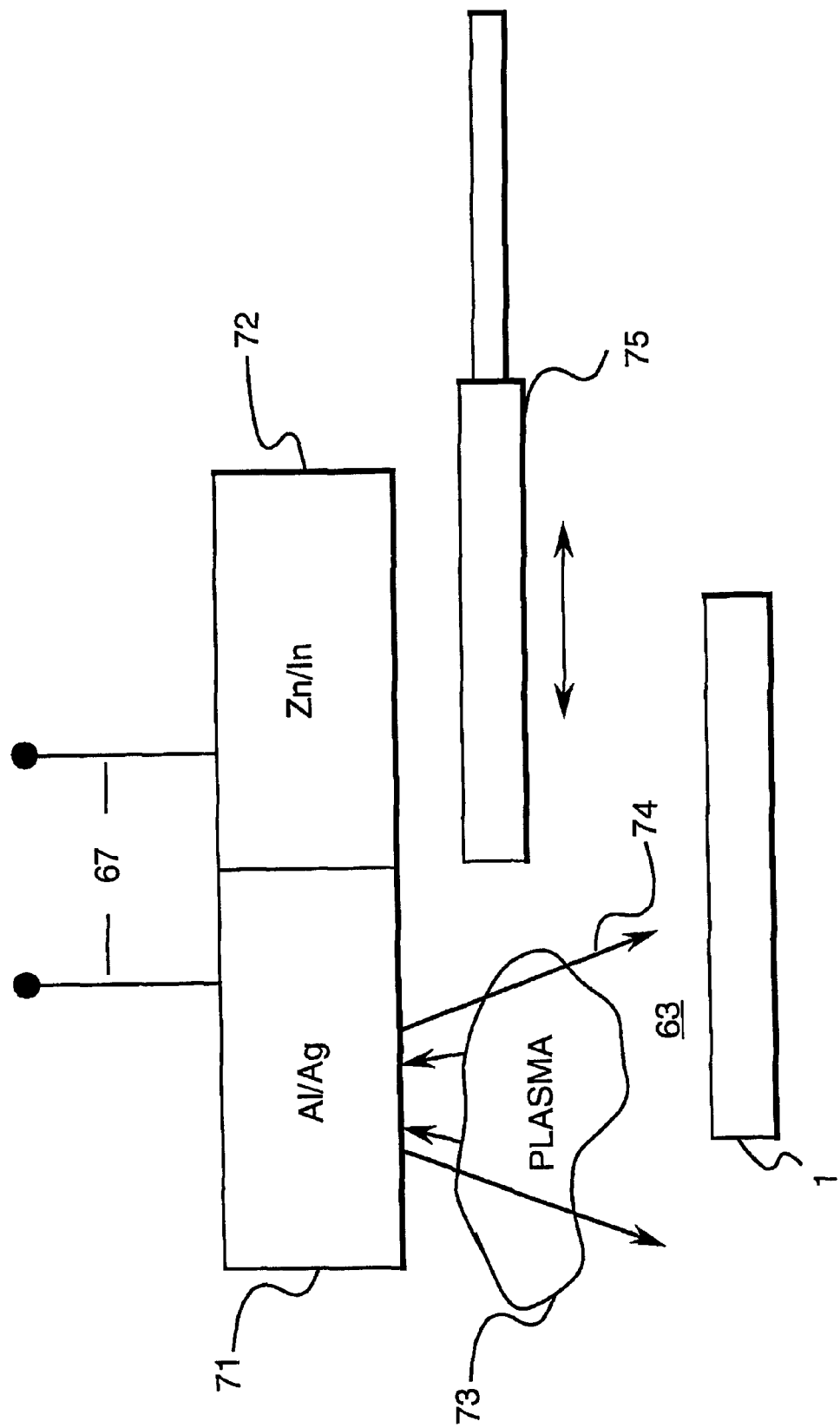
FIG. 5 is a side cross sectional view of an apparatus used to manufacture the glazed substrate according to another embodiment of the present invention.

In an alternative embodiment, an abrasion resistant and/or adhesion layer may be deposited in the same sputtering chamber. For example, as shown in FIG. 5, the target may comprise an Ag or Al portion 71 and a In:Zn or an IZO portion 72. Alternatively, there may be two or more separate targets 71 and 72. DC or RF voltage is then applied to target portion 71, while portion 72 may be covered with a shutter 75. Alternatively, if there is only one voltage supply line 67 to both target portions 71 and 72, portion 72 is simply covered by shutter 75. The plasma 73 only bombards the uncovered target portion 71, causing only Ag or Al atoms 74 to be sputtered toward the substrate 1. Thus, the Ag or Al film is sputter deposited on substrate 1.

The support is then positively biased to sputter clean layer 6 using the Ar plasma 73. The substrate 1 may be similarly cleaned before depositing layer 6. However, the cleaning step may be omitted. DC or RF voltage is then applied only to target portion 72, while portion 71 may be covered with a shutter 75. Alternatively, if there is only one voltage supply line 67 to both target portions 71 and 72, portion 71 is simply covered by shutter 75. The plasma 73 bombards only target portion 72 to sputter off Zn, In and oxygen atoms to form an IZO layer on or over the adhesion layer 6. Forming the various layers and carrying out sputter cleaning in the same chamber greatly enhances process speed and throughput.

Furthermore, the abrasion resistant layer or other layer may also be formed in the same apparatus as the UV absorbing layers. For example, to form an abrasion resistant layer, an extra sputtering target may be added to the chamber. The target may comprise silicon for reactive sputtering or silicon dioxide for inert gas sputtering to form a silicon dioxide layer. The target may also comprise aluminum for reactive sputtering or alumina ($Al_2O_3$) for inert gas sputtering to form an alumina layer. The extra targets are preferably covered by shutter 75 when other layers are being sputtered.

Since the doped metal oxide coating according to exemplary embodiments of the invention exhibits excellent weathering and protects polymeric substrates from turning yellow, there is also provided, in another aspect of the invention, a method of protecting polymeric substrates from UV degradation comprising coating the polymeric substrate with a layer comprising a doped metal oxide such as IZO or AZO. The method may also include deposition of an abrasion resistant layer and a stress relieving interlayer.

Figure 6:
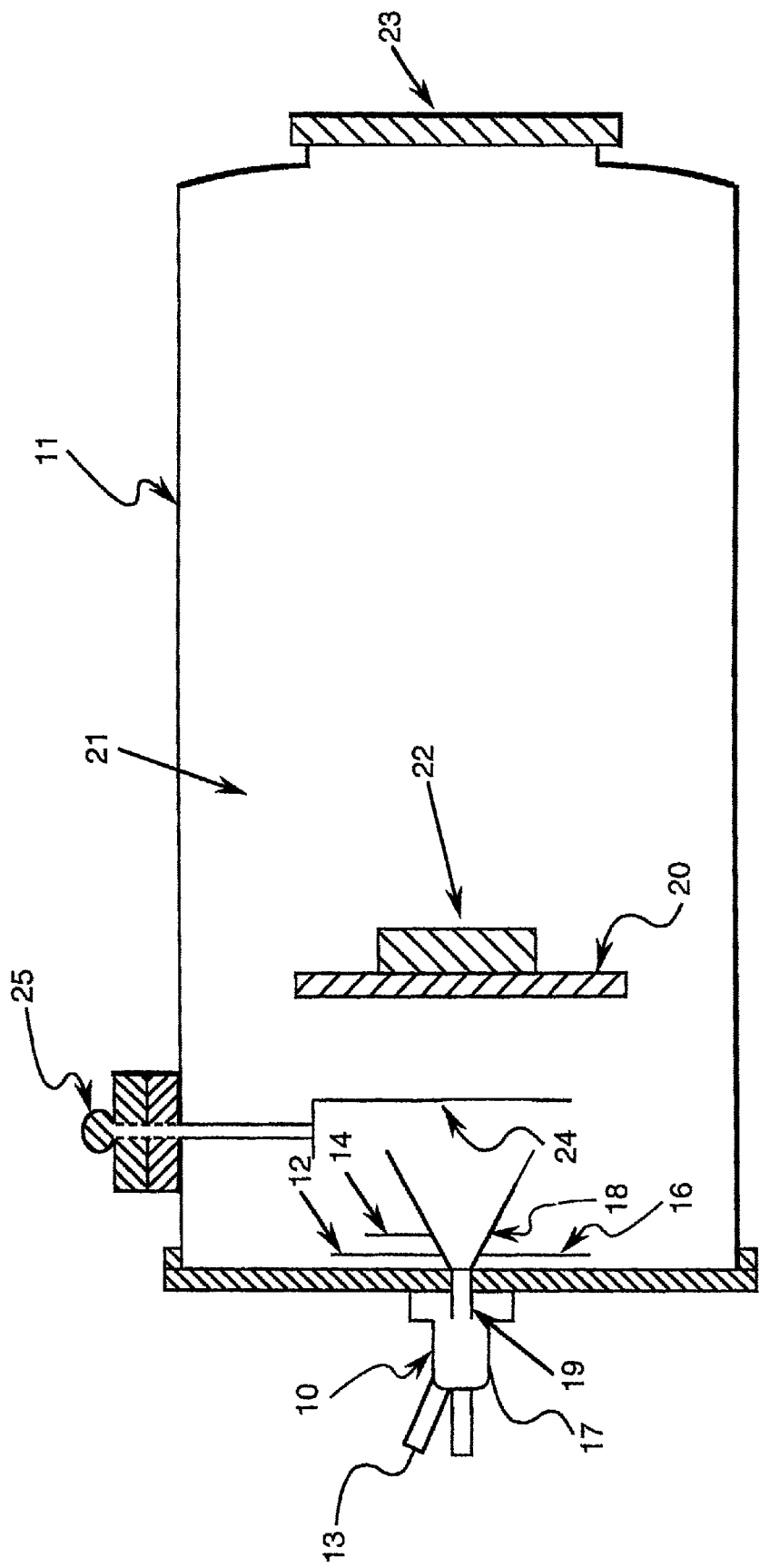
FIG. 6 is a side cross sectional view of an apparatus used to manufacture the glazed substrate according another embodiment of the invention.

As discussed above, the various layers may be applied by methods other than sputtering, such as arc plasma deposition. An arc plasma deposition apparatus for depositing the UV absorption layers according to another embodiment of the invention is shown in FIG. 6. The apparatus comprises a plasma generation chamber 10 and a deposition chamber 11. The deposition chamber 11 contains a substrate 20 mounted on a temperature controlled support 22. The substrate 20 may be a transparent polymeric substrate 1 shown in FIG. 1. The support 22 may be positioned at any position within the interior 21 of chamber 11. Typically, the substrate 20 is positioned about 15–35 cm, most typically 25.5 cm, from the anode of the plasma generation chamber 10.

Chamber 11 also optionally comprises a retractable shutter 24. The shutter may be positioned by any suitable means, such as by a handle 25 or by a computer controlled positioning mechanism. The shutter 24 may also contain a circular aperture to control the diameter of the plasma that emanates from the plasma generation chamber 10 towards the substrate 20. Chamber 11 may also optionally comprise magnets or magnetic field generating coils (not shown) adjacent to chamber walls to direct the flow of the plasma.

Chamber 11 may also contain an optional nozzle 18. The nozzle 18 provides improved control of the injection, ionization and reaction of the reactants to be deposited on the substrate 20. The nozzle 18 assists in assuring the deposition of a solid metal oxide film or layer on the substrate 20 and reduces or even prevents formation of powdery reactant deposits on the substrate 20. Typically, the nozzle 18 has a conical shape with a divergent angle (measured from one inner surface to the opposite inner surface) of about 25–60 degrees, most typically 40 degrees, and a length of about 16 cm. According to other embodiments, the nozzle 18 may have a variable cross section, such as such as conical-cylindrical-conical or conical cylindrical, a divergent angle other than 40 degrees and a length other than 16 cm. The nozzle may also be omitted entirely.

Chamber 11 also contains at least one reactant supply line. For example, chamber 11 may contain an oxygen supply line 12, a zinc supply line 14, and an indium or aluminum supply line 16 to deposit IZO or AZO on the substrate 20. The supply lines 12, 14 and 16 preferably communicate with the nozzle 18 and supply reactants into the plasma flowing through the nozzle. Chamber 11 also contains vacuum pumps (not shown) for evacuating the chamber.

The plasma generation chamber 10 contains at least one cathode 13, a plasma gas supply line 17 and an anode 19. One embodiment of the plasma generation chamber 10 is shown in more detail in FIG. 7. Typically, there are three cathodes 13, but any number of cathodes may be used depending on the particular application. Each cathode 13 may comprise tungsten or thorium doped tungsten tips. The use of thorium allows the temperature of the tips to be maintained below the melting point of tungsten, thus avoiding contamination of the plasma with tungsten atoms. Each cathode 13 may be surrounded by a cathode housing 83 to isolate each cathode 13 from the walls of the cathode support plate 28. The cathode housing 83 may suitably comprise a shell surrounding an isolating mantle made from an insulating material such as quartz. The anode 19 typically has a central aperture in the form of a diverging cone.

Each cathode 13 is typically separated from the anode 19 by at least one cascade plate 26. The cascade plate(s) preferably comprise copper discs containing a central aperture corresponding to the shape of the aperture in the anode 19.

The plasma generation chamber 10 also contains at least one plasma gas supply line 17. Optionally, chamber 10 may also contain a purging gas supply line adjacent to the plasma gas supply line 17 to supply a purging gas to chambers 10 and 11 prior to supplying a plasma gas.

The cathode support plate 28 may be attached to the cascade plate(s) 26 and the anode 19 by an insulated bolt 27 or by other fasteners. The cascade plate 26 is typically electrically insulated from the cathode support plate 28 and the anode 19 by spacers 15. Spacers 15 may comprise any suitable material, for example O-ring vacuum seals, polyvinylchloride rings and/or boron nitride rings.

Plasma discharge at high power density and high temperature tends to heat the cascade plate(s) 26 and the anode 19. Preferably, the cascade plate(s) 26 and the anode 19 include cooling channels 29 and 99, respectively. Typically, the channels 29 and 99 have a circular shape within the interior volume of the plate(s) 26 and the anode 19. Chilled water supplied through a water supply line 89 flows through the channel 99 to cool the anode 19 during operation. A similar water supply line (not shown) supplies water to the channel 29 to cool the cascade plate(s) 26.

Figure 7:
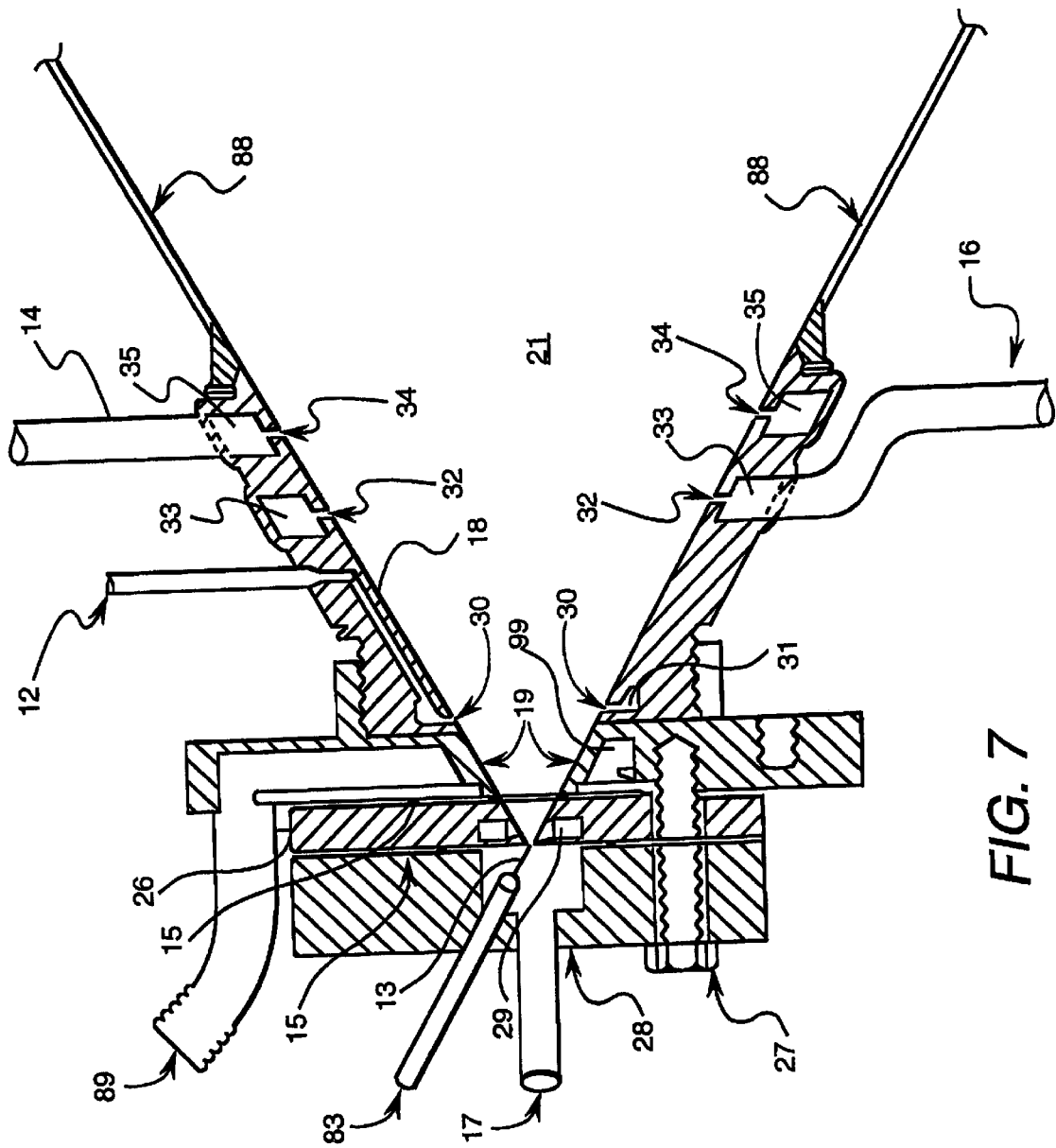
FIG. 7 is a side cross sectional view of a portion of the apparatus shown in FIG. 6.

The nozzle 18 is preferably attached to the anode 19. The nozzle 18 may contain an integral or removable divergent portion 88 for directing the plasma and reactive species flow. Preferably, the reactant supply line(s) 12, 14 and 16 are in communication with the nozzle 18. The nozzle 18 may contain a showerhead nozzle supply line which comprises a ring shaped reactant supply channel(s) connected to injection holes. For example, as shown in FIG. 7, reactant supply line 14 connects to reactant supply channel 35 formed inside the body of the nozzle 18. Reactant supply channel 35 contains a plurality of openings 34, which are preferably evenly distributed around the circumference of channel 35. The reactant flows from line 14 into the channel 35. The reactant then flows from the channel 35 simultaneously through openings 34 to enter the plasma, emanating from anode 19 into deposition chamber space 21, from several directions. Likewise, supply line 16 is connected to channel 33 and openings 32 and supply line 12 is connected to channel 31 and openings 30. However, the channel and openings may be omitted and the supply lines may deposit the reactants directly into the plasma, if desired.

To form a plasma in chamber 10, a plasma gas is supplied through plasma gas supply line 17. The plasma gas may comprise any suitable gas, such as any noble gas, nitrogen, ammonia, nitrous oxide, carbon dioxide or hydrogen or any mixture thereof. If there is more than one plasma gas, then the plural gasses may be supplied through plural supply lines. Preferably, the plasma gas comprises argon or a combination of argon and oxygen. The plasma gas in plasma generation chamber 10 is maintained at a higher pressure than the pressure in the deposition chamber 11, which is continuously evacuated by a pump. An arc voltage is then applied between the cathode(s) 13 and the anode 19 to generate a plasma in the chamber 10. The plasma then shoots out as a supersonic plasma through the anode 19 aperture into the deposition chamber 11 due to the pressure difference between chambers 10 and 11.

The reactants are supplied into the plasma through the supply lines 12, 14, 16. For example, oxygen gas may be supplied through line 12, zinc may be supplied through line 14 and indium or aluminum may be supplied through line 16 to form an IZO or AZO film on substrate 20. Zinc and indium or aluminum may be supplied through the same line (14 or 16). Of course the supply line location may be altered, and oxygen may be supplied through line 14 or 16, etc.

Zinc and indium or aluminum reactants may be supplied though a supply line in the form of metal organic gases, such as diethyl zinc, dimethyl zinc, trietheyl indium, trimethyl indium, trimethyl aluminum, or triethyl aluminum, which disassociate in the plasma stream.

Figure 8:
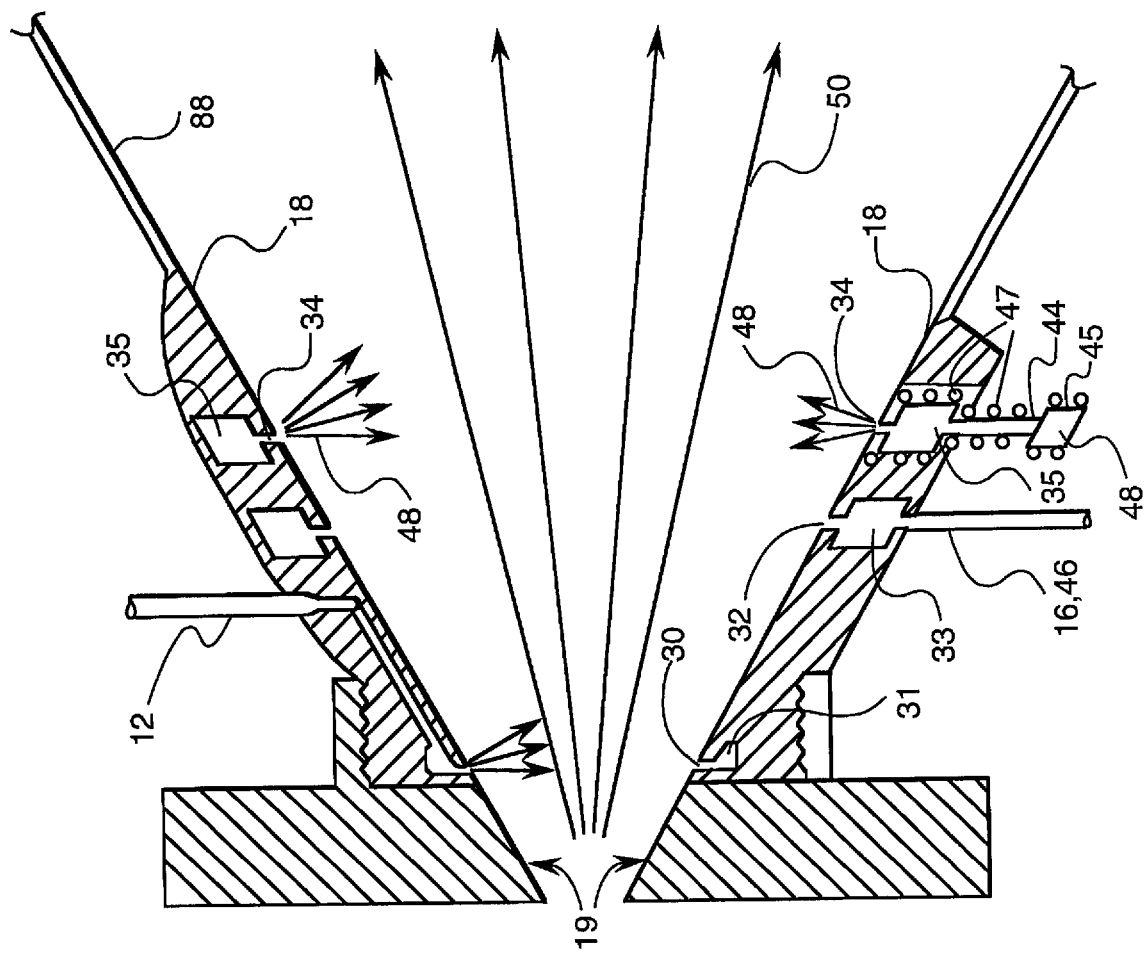
FIGS. 8–12 are side cross sectional views of exemplary apparatus used to manufacture the glazed substrate according to other embodiments of the invention.

Preferably, the zinc and/or indium or aluminum reactants are supplied in the form of a metal vapor. To generate a metal vapor, the metal supply line may be altered, for example as shown in FIG. 8. The metal supply line 14 (or 12 or 16, as necessary) may be replaced by a tube 44, such as a stainless steel tube. The tube 44 is attached to a crucible 45, such as a nickel crucible with a tantalum liner. The crucible is surrounded by a heating element 47, such as a high resistance wire or RF coils. The heating element is also wrapped around the tube 44. The heating element is kept at a temperature sufficient to prevent the metal from solidifying in the tube 44. For example, in the case of zinc, the heating element is kept above the melting point of zinc, and typically above 800° C. Preferably, the heating element 47 also extends to the nozzle 18 to prevent the metal from solidifying therein.

The metal reactant 48 is preferably loaded into the crucible 47 such that the reactant abuts the pipe 44. The heating element is activated to evaporate the metal reactant 48 into the pipe 44. The metal reactant is then fed into the plasma 50 from pipe 44 through channel 35 and openings 34. To deposit a ZnO film, the metal reactant is zinc. To deposit an IZO film, the metal reactant 48 may be an In:Zn alloy, such as 2.5 atomic % In:Zn. The details of pressure, temperature and other parameters are described in U.S. Ser. No. 09/271,655, entitled "Method and Apparatus for Arc Plasma Deposition with Evaporation of Reagents", by Iacovangelo et al., filed on the same day as the present application, which is hereby incorporated in its entirety by reference.

Alternatively, indium or aluminum vapor may be supplied through a conduit separate from the zinc vapor conduit. In this embodiment, the second metal supply line 16 is replaced with a second tube 46 and a second crucible containing indium. The zinc and indium or aluminum vapor enter the plasma, where they mix with oxygen supplied through supply line 12. The metals and oxygen reactants mix in the plasma 50 to form IZO or AZO which deposits on the substrate 20 as a thin film as the plasma strikes the substrate.

Figure 9:
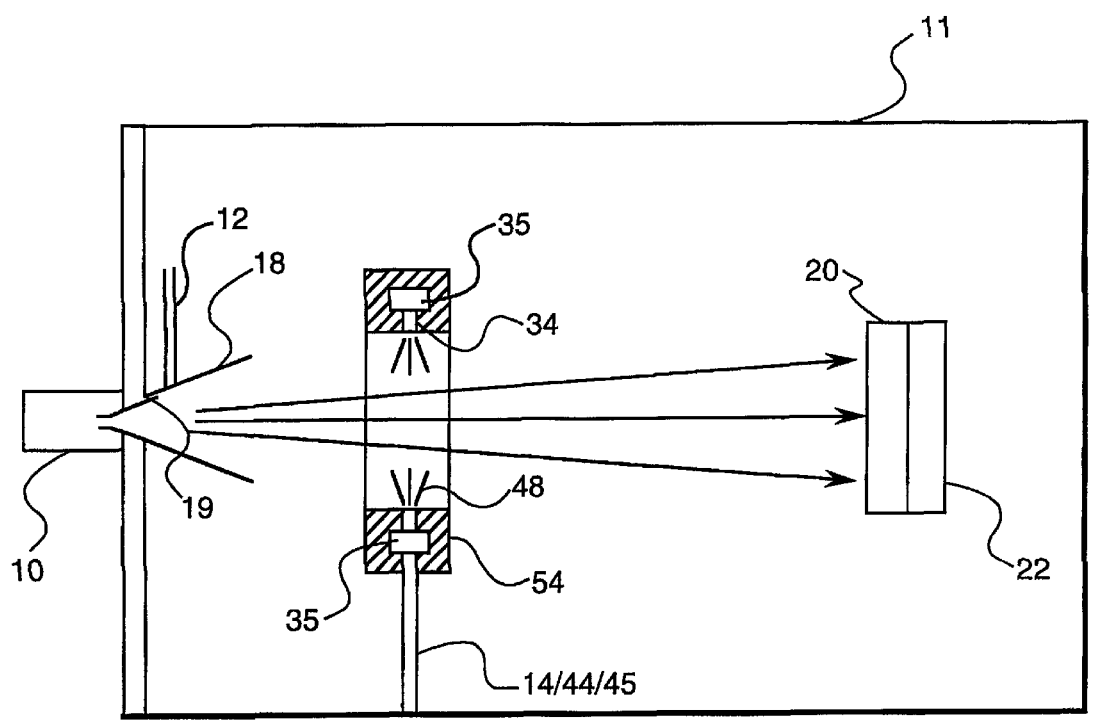

In an alternative embodiment, at least one reactant inlet, such as a metal reactant inlet 54, may be located distal from the anode 19, as shown for example in FIG. 9. The inlet 54 may have a ring shape with a wide aperture in the center of the ring. The inlet preferably contains a reactant supply channel 35 and reactant supply openings 34 similar to the previous embodiment, such as the ones shown in FIG. 8. The plasma 50 passes through the aperture in the inlet 54. The reactant is supplied to channel 35 through a supply line 14 if the reactant is a gas or through a pipe 44 and crucible 45 if the reactant is a vapor. The reactant 48 enters the plasma 50 from plural openings 34. In this embodiment, the nozzle 18 may be omitted because the inlet 54 controls the shape and direction of the plasma 50.

Figure 10:
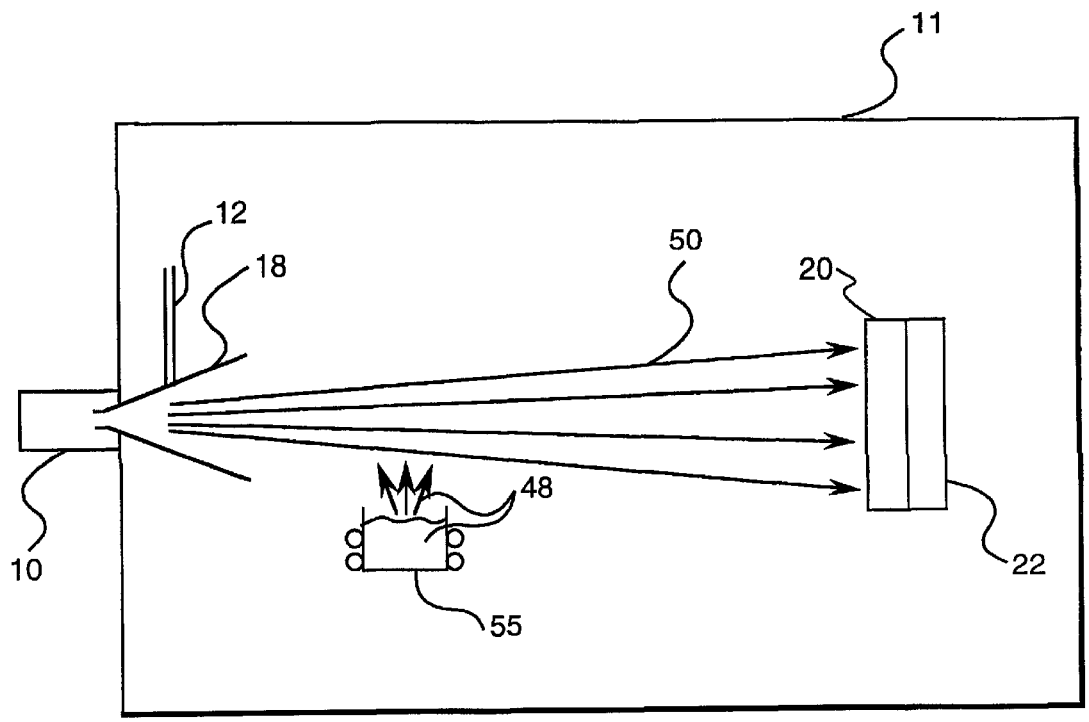

In another embodiment, the reactant inlet may comprise a crucible 55, as shown for example in FIG. 10. Solid Zn, In:Zn, or Al:Zn 48 may be evaporated from the crucible 55 directly into the plasma 50.

Figure 11:
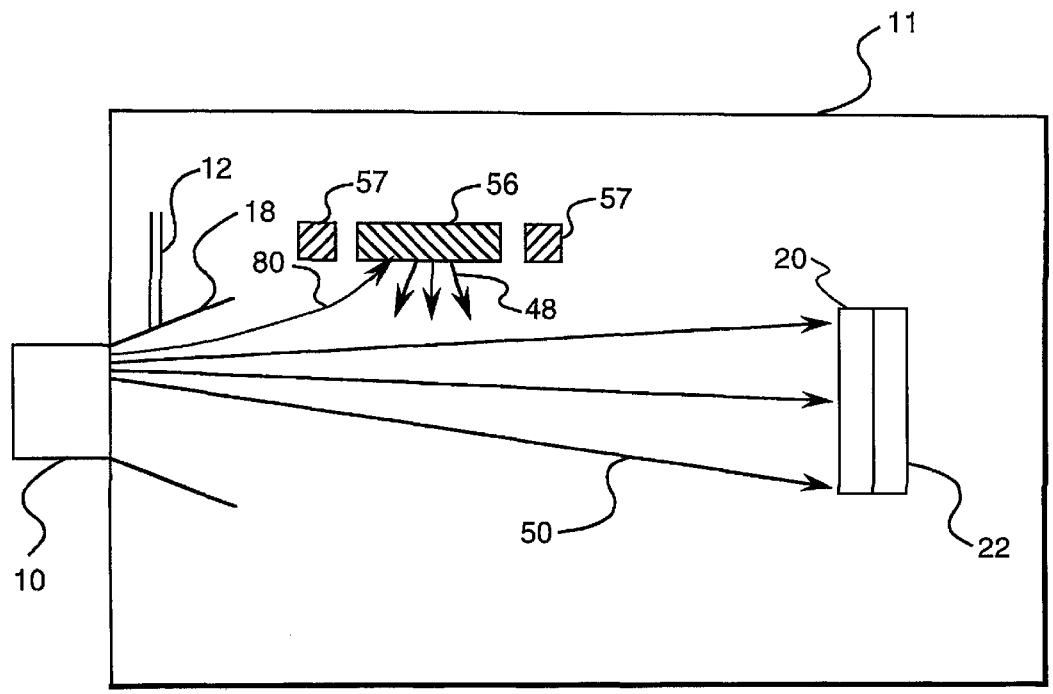

In yet another embodiment, the reactant source may comprise a biased sputtering target 56 (e.g. cathode) adjacent to a biased anode 57, as shown for example in FIG. 11. Edge portions of the plasma 80 are drawn to the biased target 56 and sputter off target atoms 48, that drift into the main portion of the plasma 50. The reactant atoms combine in the plasma and are deposited on the substrate 20 by the arc. The target 56 may comprise any suitable material, such as Zn, In:Zn, ZnO, IZO, Al:Zn, or AZO. If the target 56 contains oxygen, then a separate source of oxygen may be omitted. Likewise, the injection nozzle 18 may be omitted.

Figure 12:
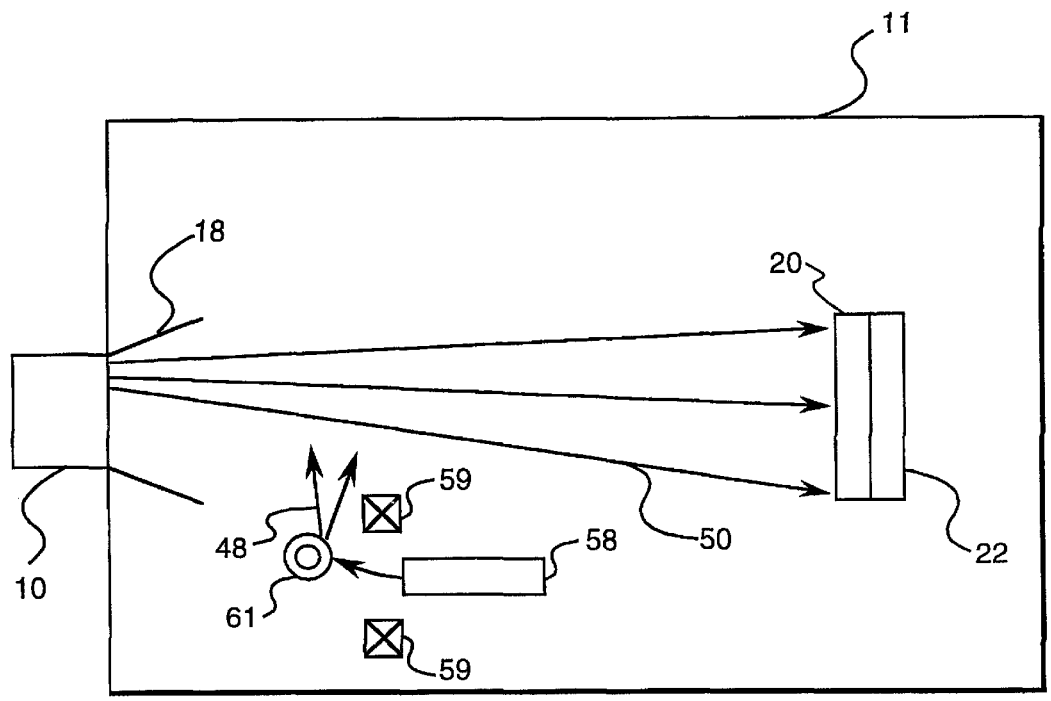

In another embodiment, the reactant source comprises an e-beam evaporation system, as shown for example in FIG. 12. An electron gun 58 emits a beam of electrons 60. The electron beam is directed toward a reactant target 61 by magnet(s) 59. As the electron beam 60 strikes the reactant target 61, it evaporates reactant atoms 48 from the reactant target. Preferably, the reactant target is a rotating wheel to allow uniform reactant release from the target 61. The reactant atoms 48 migrate toward the plasma 50 to be deposited on the substrate 20. The target 61 may comprise Zn, In:Zn, ZnO, IZO, Al:Zn, or AZO. If the target 61 contains oxygen, then a separate source of oxygen may be omitted. Likewise, the nozzle 18 may be omitted.

Furthermore, the abrasion resistant layer 3, the interlayer(s) 4 and/or 5 and the adhesion promoting layer 6, if any are utilized in the structure, may be formed in the same chamber as the UV absorbing layers. For example, a silicon dioxide, alumina, or polymerized organosilicon abrasion resistant coating may be deposited by supplying oxygen and silicon or aluminum or organosilicon reactants into the plasma. Preferably a purging gas is flown through chamber 11 between depositions of each layer. Deposition of several layers in the same chamber increases process throughput and decreases process cost.

The present invention, thus generally described, will be understood more readily by reference to the following examples, which are provided by way of illustration and are not intended to be limiting of the present invention.

In the following examples, optical density ("OD", also known as "absorbance") refers to the absorbance of radiation having a wavelength of 350 nanometers (UV), defined as $\log(l_i/l_o)$, where $l_i$ is the intensity incident on the deposit and $l_o$ is the output intensity. Optical density was measured on a Unicam UV-3 spectrometer. Haze refers to the percentage of light scattering. The haze was measured using a Gardner XL-835 colorimeter. In Table 1 below, "high power" is 100 W (4.9 W/cm$^2$), and "low power" is 75 W (3.68 W/cm$^2$).

In Examples 1–2, the samples were subjected to a water soak test involving submerging the sample in 65° C. water for 24 hours.

Examples 3–9 were subjected to a QUV® accelerated weathering test (hereinafter the "QUV test"). This test was carried out in a model QUV environmental chamber manufactured by the Q-Panel Company. Samples were placed in the chamber and exposed for consecutive cycles, each cycle consisting of 5 hours at 60° C. with exposure to UV light (295 nm–370 nm, with a maximum at 340 nm, using UVA-340 lamps) followed by 1 hour at 50° C. with moisture condensation.

EXAMPLE 1

A glass substrate was cleaned in isopropyl alcohol and air dried. The reactor chamber was pumped to 2.7×10$^{-4}$ Pa prior to introduction of the reactive gas. The substrate was sputter etched at 100 watts for 2 minutes in an argon plasma at 1.2 Pa. A ZnO layer was deposited by RF magnetron sputtering on the substrate at a power of 100 W (power density=4.9 W/cm$^2$) and a pressure of 0.8 Pa from a ZnO target. The thickness of the ZnO layer was about 500 nm. The ZnO layer was subjected to a water soak test by being submerged in 65° C. water for 24 hours. The optical density at a wavelength of 350 nm and the haze were measured before and after the water soak test. The optical density of the ZnO layer decreased from 4.0 to 3.2, and Δ%H was 7% after the water soak test.

EXAMPLE 2

The experiment of example 1 was repeated, except the Ar sputtering gas was replaced with an Ar and 7% O$_2$ sputtering gas. The OD decreased from 3.9 to 3.5 after the water soak test. Δ%H was 5%.

EXAMPLE 3

The experiment of example 1 was repeated, except that the Ar sputtering gas was replaced with an Ar and 10% O$_2$ sputtering gas. In lieu of the water soak test, the QUV test was conducted, as described above, for 300 hours. The OD decreased from 4.2 to 3.4 after the QUV test. Δ%H was 1.4%.

EXAMPLE 4

The experiment of example 3 was repeated, except that the QUV test was extended to 1,000 hours (total). The OD decreased from 4.2 to 3.4 after the QUV test. Δ%H was 10%. The QUV test was continued to 3000 hours (not shown in Table 1), at which point the optical density had decreased to 0.2.

EXAMPLE 5

The experiment of example 3 was repeated, except that the ZnO layer was replaced with an In$_{0.025}$Zn$_{0.975}$O layer deposited by DC magnetron sputtering from a 1.5 weight % indium IZO target and the sputtering power was decreased to 75 W. The OD remained constant at 4.2 after 300 hours of the QUV test. Δ%H after the QUV test was 0%.

EXAMPLE 6

The experiment of example 5 was repeated, except that the power was increased to 100 W. The OD remained constant at 4.0 after 300 hours of the QUV test. Δ%H after the QUV test was 0%.

EXAMPLE 7

The experiment of example 5 was repeated, except that the length of the QUV test was increased to 1000 hours (total). The OD decreased from 4.2 to 4.0 after the QUV test. Δ%H was 0%.

EXAMPLE 8

The experiment of example 6 was repeated, except that the length of the QUV test was increased to 1000 hours (total). The OD decreased from 4.2 to 4.0 after the QUV test. Δ%H was 0%.

CONTROL EXAMPLE 9

The experiment of example 4 was repeated, except that the ZnO layer was covered with a SiO$_2$ abrasion resistant layer to prevent water from reacting with the ZnO layer. This was done to separate the effect of UV exposure from water stability. The OD decreased from 4.2 to 4.1 after the QUV test. Δ%H was 12%. The increase in haze was associated with the SiO$_2$ layer, and not with the ZnO layer. Therefore, the UV exposure alone did not substantially affect the OD and Δ%H of the metal oxide layers. The results of the weathering tests are summarized in Table 1 below.

TABLE 1

| # | Coating | Plasma | Power | Hours | OD | Results After Weathering Test OD | Δ % H |
|---|---|---|---|---|---|---|---|
| 1 | ZnO | Ar | High | 24 | 4.0 | 3.2 | 7 |
| 2 | ZnO | 7% O$_2$ | High | 24 | 3.9 | 3.5 | 5 |
| 3 | ZnO | 10% O$_2$ | High | 300 | 4.2 | 3.4 | 1.4 |
| 4 | ZnO | 10% O$_2$ | High | 1000 | 4.2 | 3.4 | 10 |
| 5 | IZO | Ar | Low | 300 | 4.2 | 4.2 | 0.0 |
| 6 | IZO | Ar | High | 300 | 4.0 | 4.0 | 0.0 |
| 7 | IZO | Ar | Low | 1000 | 4.2 | 4.0 | 0.0 |
| 8 | IZO | Ar | High | 1000 | 4.2 | 4.0 | 0.0 |
| 9 | ZnO/SiO$_2$ | 10% O$_2$ | High | 1000 | 4.2 | 4.1 | 12 |

Examples 1 and 2, which were ZnO deposited with Ar and 7% O$_2$/Ar plasma, turned hazy after only 1 day of the water soak test. In comparison, examples 3–4 deposited with 10% oxygen exhibited good stability with little change after 300 hours of the QUV test. However, there was a considerable increase in haze after 1000 hours. The OD also deteriorated from 4.2 to 3.4. Therefore, ZnO layers with acceptable weather resistance may be deposited by reactive sputtering when sufficient oxygen reactant is present in the plasma.

All of the IZO samples 5–8 showed no significant degradation after 300 or 1000 hours of the QUV test, either in OD or haze. Samples 5 and 7 were deposited at a lower power (75 W) which results in a higher stress in the deposit. Based on this data there does not appear to be an effect of stress on stability. The preferred metal oxide UV absorbing layer 2 of the coated structure described above has an optical density of at least 4.0 and exhibits substantially zero increase in haze after being exposed the QUV test for 300 or 1000 hours.

EXAMPLE 10

A ZnO layer was deposited on glass by RF magnetron sputtering in an argon/10% oxygen plasma at a power of 100 W. The sample had an initial optical density of 4.2.

The sample was then subjected a UV accelerated weathering test in an Atlas Ci35a xenon arc Weatherometer® using Type S borosilicate inner and outer filters. The irradiance level was 0.77 W/m$^2$ at 340 nm. The black panel temperature was 70–73° C. The dry bulb temperature was 45° C. with a wet-bulb depression of 10° C. (50% RH).

The cycle was 160 minutes light, 5 minutes dark, 15 minutes dark with water spray. This cycle accumulates 2.46 kJ/m$^2$ at 340 nm per hour of run-time.

After 392 hours (932 KJ/m$^2$) in the weatherometer, the increase in haze was 10%. After 900 hours (2141 KJ/m$^2$), the optical density had decreased to 0.2.

The following examples 11–18 illustrate additional methods of forming a doped zinc oxide layer with improved weatherability. The weatherability data, i.e. increase in haze and loss of UV absorbency, are presented in Table 2 below.

All samples were formed on glass substrates by sputtering at a pressure of 12 milliTorr with an argon/7% oxygen sputtering gas. The working distance from the target to the substrate was 6.35 cm. After formation, the samples were subjected to a water soak test, in which the samples were submerged in 65° C. water for the time periods specified below.

EXAMPLE 11

A layer of ZnO was deposited by RF magnetron sputtering at a power of 100 W with a ZnO target. The initial optical density was 2.5. The average increase in haze during a 7-day water soak test was 4.0% per day. The average daily loss of optical density was 0.45.

EXAMPLE 12

A layer of IZO containing indium in the amount of 2.5 atomic percent of the total metal content of the IZO layer was deposited by RF sputtering. The target was IZO with indium comprising 2.5 atomic percent of the total metal content of the target. The initial optical density was 2.4. The average daily increase in haze during the 10-day water soak test was 3.0%. The average daily loss of optical density was 0.25.

EXAMPLE 13

A layer of IZO containing indium in the amount of 5.0 atomic percent of the total metal content of the IZO layer was deposited by RF magnetron sputtering. The target was IZO with indium comprising 5.0 atomic percent of the total metal content of the target. The initial optical density was 1.5. The average daily increase in haze during the 21-day water soak test was 4.0%. The average daily loss of optical density was 0.05.

EXAMPLE 14

A layer of IZO containing indium in the amount of 2.5 atomic percent of the total metal content of the IZO layer was deposited by DC magnetron sputtering. The target was IZO with indium comprising 2.5 atomic percent of the total metal content of the target. The initial optical density was 3.0. The average daily increase in haze during the 21-day water soak test was 0.3%. The average daily loss of optical density was 0.02.

EXAMPLE 15

A layer of IZO containing indium in the amount of 10.0 atomic percent of the total metal content of the IZO layer was deposited by RF sputtering. The target was IZO with indium comprising 10.0 atomic percent of the total metal content of the target. The initial optical density was 2.9. The average daily increase in haze during the 23-day water soak test was 0.6%. The average daily loss of optical density was 0.12.

EXAMPLE 16

A layer of IZO containing indium in the amount of 15 atomic percent of the total metal content of the IZO layer was deposited by RF sputtering. The target was IZO with indium comprising 15 atomic percent of the total metal content of the target. The initial optical density was 2.2. The average daily increase in haze during the 23-day water soak test was 0.4%. The average daily loss of optical density was 0.08.

EXAMPLE 17

A layer of AZO containing aluminum in the amount of 2.5 atomic percent of the total metal content of the AZO layer was deposited by DC magnetron sputtering. The target was aluminum doped zinc oxide with aluminum comprising 2.5 atomic percent of the total metal content of the target. The initial optical density was 3.0. The average daily increase in haze during the 21-day water soak test was 3.0%. The average daily loss of optical density was 0.04.

EXAMPLE 18

A layer of AZO containing aluminum in the amount of 2.5 atomic percent of the total metal content of the AZO layer was deposited by RF magnetron sputtering. The target was aluminum doped zinc oxide with aluminum comprising 2.5 atomic percent of the total metal content of the target. The initial optical density was 4.0. The average daily increase in haze during the 21-day water soak test was 2.0%. The average daily loss of optical density was 0.05.

TABLE 2

| Ex. | Layer | type of sputtering | Power (W) | Dopant/% | Initial OD | Δ OD per day | Δ % H per day |
|---|---|---|---|---|---|---|---|
| 11 | ZnO | RF mag. | 100 | N/A | 2.5 | 0.45 | 4.0 |
| 12 | IZO | RF | 150 | In/2.5% | 2.4 | 0.25 | 3.0 |

TABLE 2-continued

| Ex. | Layer | type of sputtering | Power (W) | Dopant/% | Initial OD | Δ OD per day | Δ % H per day |
|---|---|---|---|---|---|---|---|
| 13 | IZO | RF mag | 100 | In/5.0% | 1.5 | 0.05 | 4.0 |
| 14 | IZO | DC mag | 100 | In/2.5% | 3.0 | 0.02 | 0.3 |
| 15 | IZO | RF | 125 | In/10% | 2.9 | 0.12 | 0.6 |
| 16 | IZO | RF | 150 | In/15% | 2.2 | 0.08 | 0.4 |
| 17 | AZO | DC mag | 100 | Al/2.5% | 3.0 | 0.04 | 3.0 |
| 18 | AZO | RF mag | 75 | Al/3.0% | 4.0 | 0.05 | 2.0 |

As shown in Table 2, the IZO layer of example 14 prepared by DC magnetron sputtering had a relatively high initial optical density of 3.0, a low daily decrease in optical density (0.02), and a low daily increase in haze (0.3). These properties were achieved with an indium content of 2.5%. Examples 15 and 16 also exhibited a relatively low decrease in optical density and increase in haze, but the indium content was considerably higher, i.e. 10% and 15%, respectively.

The AZO layers of examples 17 and 18 exhibited a relatively high initial optical density and a relatively low loss in optical density per day. However, the increase in haze of the AZO layers was relatively high at 3.0% and 2.0% per day.

Therefore, a preferred doped zinc oxide UV absorbing layer is formed by DC magnetron sputtering and has an initial optical density of at least 3.0, and after a water soak test for 21 days has a daily decrease in optical density of at most 0.02 and a daily increase in haze of at most 0.3. Other preferred doped zinc oxide coatings have initial optical densities of at least 2.0, and after water soak testing for 23 days, have a daily decrease in optical density of at most 0.12 and a daily increase in haze of at most 0.6.

EXAMPLE 19

An IZO sample was deposited on glass by DC magnetron sputtering in an argon plasma at a power of 100 W. The IZO layer contained indium in the amount of 2.5 atomic percent of the total metal content of the IZO layer. The target was IZO with indium comprising 2.5 atomic percent of the total metal content of the target. The initial optical density of the sample was 3.09.

The sample was then subjected to a UV accelerated weathering test in a xenon arc weatherometer, as described above in Example 10. After 3786 hours in the weatherometer (8945 KJ/m$^2$), the optical density had decreased only slightly to 2.93. There was no increase in haze as compared to a control sample comprising glass.

EXAMPLE 20

An IZO sample was deposited on glass by sputtering DC magnetron in an argon plasma at a power of 100 W. The IZO layer contained indium in the amount of 2.5 atomic percent of the total metal content of the IZO layer. The target was IZO with indium comprising 2.5 atomic percent of the total metal content of the target. The initial optical density of the sample was 3.52.

The sample was then subjected to a UV accelerated weathering test in a xenon arc weatherometer, as described above in Example 10. After 3786 hours in the weatherometer (8945 KJ/m$^2$), the optical density had decreased only slightly to 3.43. There was no increase in haze as compared to a control sample comprising glass.

Examples 19–20 illustrate that a UV absorbing layer formed of indium doped zinc oxide can have a relatively high optical density and can maintain that optical density for a substantial period of time under accelerated weathering conditions.

In the following examples 21–23, arc plasma deposition, as described above with respect to FIGS. 6–8, was used to deposit doped zinc oxide layers on glass. The arc plasma generator included a copper anode separated from three needle-type cathodes of thoriated tungsten by at least one electrically isolated copper disk.

Each chamber was pumped to less than 1 milliTorr and back flushed with nitrogen to about 500 Torr then pumped back down at least two times to remove residual moisture from the chamber prior to introduction of the reactants. The substrates were etched at 50 W for 10 seconds in an argon plasma (2 lpm Ar) at 20–30 mT. The working distance (anode to substrate) for all examples was 25.5 cm.

In Table 3 below, "Zn Srce" refers to the zinc source, which is either dimethyl zinc (DMZ) or solid zinc (Zn) evaporated in a crucible. "Dopant Srce" refers to the source of the dopant, trimethyl aluminum (TMA) or triethyl indium (TEI). "% Dopant" refers to the amount of dopant in the layer in terms atomic percent of the total metal content of the layer.

EXAMPLE 21

An aluminum doped zinc oxide layer was deposited on glass. The zinc source was dimethyl zinc. The aluminum source was trimethyl aluminum. The dimethyl zinc flow rate was 0.6 lpm. The TMA flow rate was 0.06 lpm. The oxygen flow rate was 6.7 lpm. The argon flow rate was 1.25 lpm. The arc current was 60 amps. The pressure was 100 mT. The AZO layer had a thickness of 0.52 microns and was deposited in 5 seconds. The optical density of the AZO layer at 350 nanometers was 2.48.

EXAMPLE 22

An aluminum doped zinc oxide layer was deposited on glass. The zinc source was solid zinc which was evaporated into the plasma. The aluminum source was trimethyl aluminum. The zinc temperature was 800° C. The TMA flow rate was 0.06 lpm. The oxygen flow rate was 4.0 lpm. The argon flow rate was 1.5 lpm. The arc current was 35 amps. The pressure was 80 mT. The AZO layer had a thickness of 0.38 microns and was deposited in 20 seconds. The optical density of the AZO layer at 350 nanometers was 1.95.

EXAMPLE 23

An indium doped zinc oxide layer was deposited on glass. The zinc source was solid zinc which was evaporated into the plasma. The indium source was triethyl indium. The zinc temperature was 800° C. The TEI flow rate was 0.06 lpm. The oxygen flow rate was 4.0 lpm. The argon flow rate was 1.5 lpm. The arc current was 35 amps. The pressure was 80 mT. The IZO layer had a thickness of 0.63 microns and was deposited in 20 seconds. The optical density of the AZO layer at 350 nanometers was 3.8.

TABLE 3

| # | Layer | Zn Srce | Dopant Srce | % Dopant | OD |
|---|---|---|---|---|---|
| 21 | AZO | DMZ | TMA | 2.5 | 2.48 |
| 22 | AZO | Zn | TMA | 2.5 | 1.95 |
| 23 | IZO | Zn | TEI | 2.8 | 3.8 |

The invention has been disclosed broadly and illustrated in reference to representative embodiments described above.

Those skilled in the art will recognize that various modifications can be made to the present invention without departing from the spirit and scope thereof.

What is claimed is:

1. A method of preparing a layered structure, said layered structure having improved chemical stability for use in glazing applications, said method comprising the steps of:

providing a transparent polymeric substrate selected from the group consisting of polycarbonate, polyethercarbonate, polyethersulfone and polyetherimide; and forming an indium doped zinc oxide layer, said layer having a composition of about $In_{0.02-0.15}Zn_{0.85-0.98}O$, directly on the polymeric substrate to provide a transparent structure wherein the optical density of the doped zinc oxide layer is greater than 2.0.

2. The method of claim 1, further comprising the step of forming an abrasion resistant layer on the doped zinc oxide layer.

3. The method of claim 2, wherein the abrasion resistant layer comprises at least one of silicon dioxide, alumina, or a plasma polymerized organosilicon.

4. The method of claim 1, wherein the doped zinc oxide layer has a thickness of between 1 and 1,000 nm.

5. The method of claim 1, wherein the doped zinc oxide layer has a thickness of between 300 and 600 nm.

6. The method of claim 1, wherein the doped zinc oxide layer has an optical density of at least 4 and exhibits substantially zero increase in haze after being subjected to an accelerated weathering test for at least 300 hours.

7. The method of claim 1, wherein the doped zinc oxide layer is formed in a first chamber of a coating apparatus.

8. The method of claim 7, further comprising the step of forming at least one of an abrasion resistant layer, an adhesion promoting layer, and a stress relief layer in said first chamber of the coating apparatus.

9. The method of claim 1, wherein the layer is formed by DC or RF magnetron sputtering.

10. The method of claim 1, wherein the steps of forming the doped zinc oxide layer comprise:

mounting the substrate on a support in a chamber;

mounting a target in the chamber;

introducing a sputtering gas into the chamber;

creating a sputtering gas plasma in the chamber;

directing the sputtering gas toward the target; and sputtering a reactant vapor from the target toward the substrate.

11. The method of claim 10, wherein the target comprises an indium doped zinc oxide target; and the sputtering gas comprises argon.

12. The method of claim 10, wherein the step of creating the sputtering gas plasma comprises applying a DC voltage to the target and applying a magnetic field to the plasma to carry out DC magnetron sputtering.

13. A method of forming an indium doped zinc oxide layer, said layer having a composition of about $In_{0.02-0.15}Zn_{0.85-0.98}O$, on a polymeric substrate to produce a layered structure with improved chemical stability for use in glazing applications, said method comprising the steps of:

placing the substrate in a sputtering chamber;

providing indium and zinc in at least one target; and performing DC magnetron arc plasma deposition on the target to form an indium doped zinc oxide layer on the substrate.

* * * * *